May 9, 1944.   J. W. CARTER ET AL   2,348,521
RUNNER GATE OPERATOR
Filed July 13, 1943

INVENTORS:
JOHN WILLIAM CARTER
and TRUMAN H. KENNEDY.
BY: John E. Jackson
Attorney.

Patented May 9, 1944

2,348,521

UNITED STATES PATENT OFFICE 2,348,521

RUNNER GATE OPERATOR

John William Carter and Truman H. Kennedy, McKeesport, Pa., assignors to National Tube Company, a corporation of New Jersey Application July 13, 1943, Serial No. 494,538

4 Claims. (Cl. 266—38)

This invention relates to a runner gate operator for operating the gates in blast furnace cinder runners and the like. In use, these gates become frozen and are loosened by hammering. The workmen do this difficult job under adverse conditions since the atmosphere in the vicinity of the gate is hot and filled with dust particles.

It is an object of the present invention to provide a simple mechanism for opening a runner gate.

Another object is to provide such a mechanism which can be operated from a remote position.

This and other objects will be more apparent after referring to the following specification and attached drawing, in which.

Figure 1:
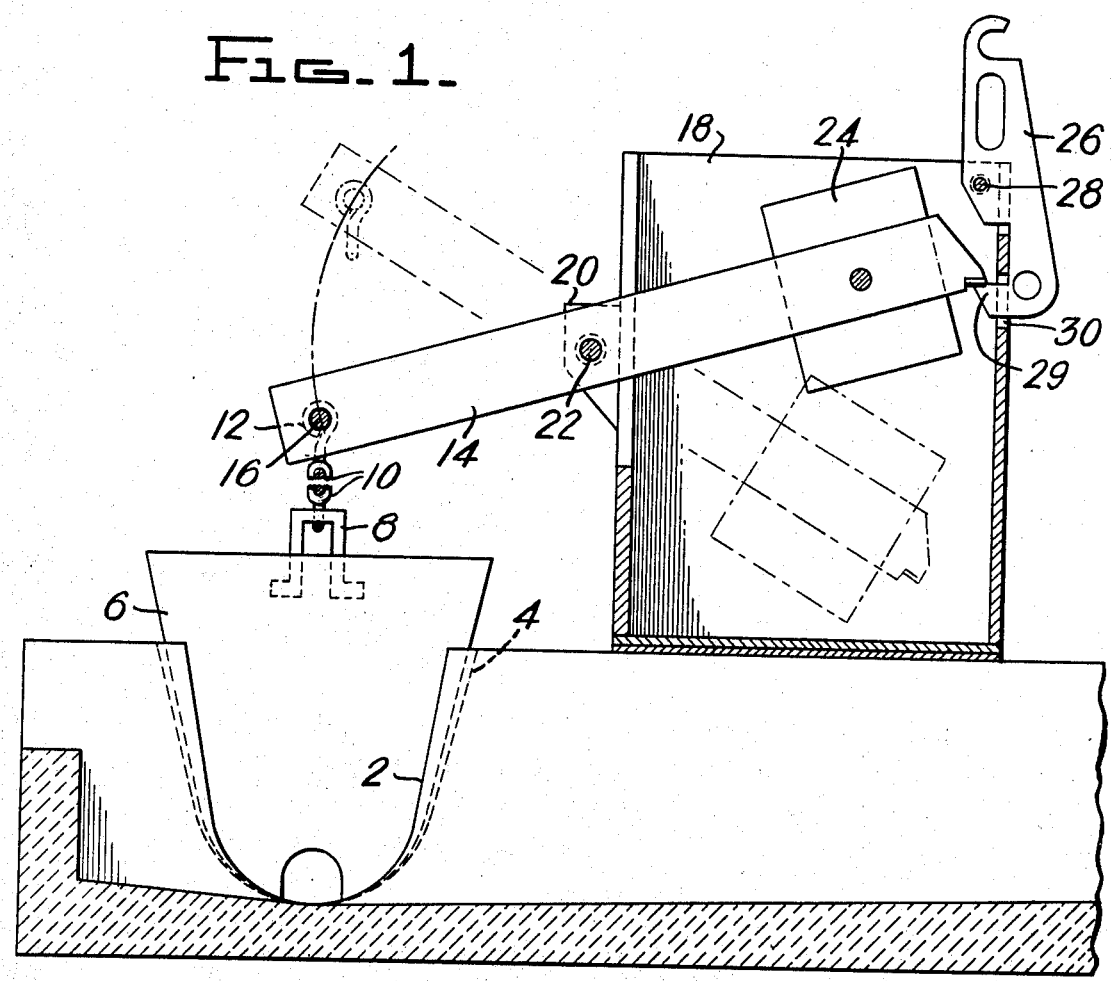
Figure 1 is an elevation taken on the line I—I of Figure 2.
Figure 2:
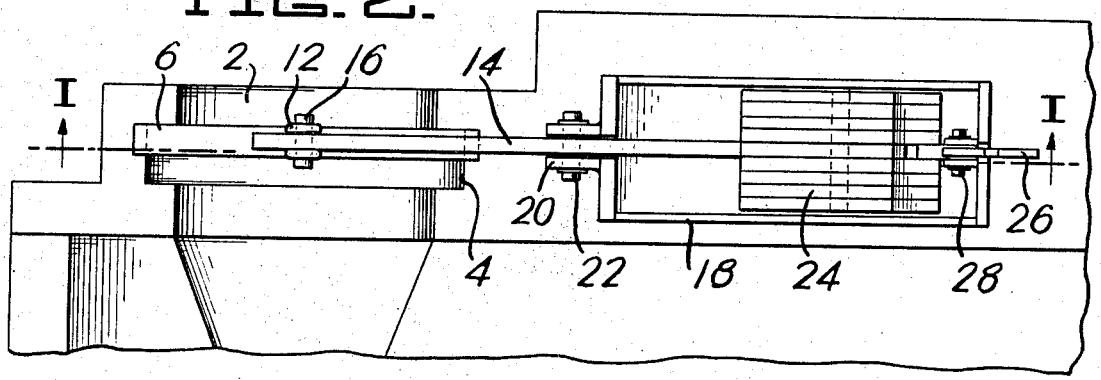
Figure 2 is a plan view of the invention.

Referring more particularly to the drawing the reference numeral 2 indicates a cinder runner having a slot 4 therein for receiving the gate 6 which controls the flow of the slag through the runner. Attached to the upper part of the gate 6 is a link 8 to which is connected one end of a chain or tension member 10. The other end of the chain is connected to an eye-bolt 12 which is connected to a lever 14 by means of a pin 16. To one side of the runner is a support 18 to which is welded a bracket 20. The lever 14 is pivotally mounted on a pin 22 supported by the bracket 20. The free end of the lever 14 carries a counterweight 24 which is held in an elevated position by means of a latch 26 pivotally mounted on a pin 28 carried by the support 18. The lower part of the latch carries a catch 29 which is adapted to pass through a hole 30 in the support 18 to hold the lever 14 in its raised position.

The operation of the device is as follows:

When the gate 6 is closed, the lever 14 is normally held in the elevated position shown in full lines in Figure 1. The tension member 10 is of such a length that a substantial amount of slack is present when the lever 14 is in elevated position. To open the gate the operator by means of a long rod or other suitable device swings the lower end of the latch 26 away from the lever 14. This releases the lever 14 and permits it to drop freely and gain enough momentum so that the gate 6 is snapped loose when the chain 10 becomes taut.

While one embodiment of the invention has been shown and described, it will be apparent that other adaptations and modifications may be made without departing from the scope of the attached claims.

We claim:

1. A runner gate operator comprising a tension member connected to said gate, said member normally being untensioned when said gate is closed, and means connected to said member for snapping said member taut to thereby loosen said gate.

2. A runner gate operator comprising a tension member connected to said gate, said member normally being untensioned when said gate is closed, a weight connected to said member, means for holding said weight in an elevated position, and means for releasing said first named means to permit said weight to drop and thereby snap said gate loose.

3. A runner gate operator comprising a tension member connected to said gate, said member normally being untensioned when said gate is closed, a lever connected to said member, and means connected to said lever for snapping said member taut to thereby loosen said gate.

4. A runner gate operator comprising a tension member connected to said gate, said member normally being untensioned when said gate is closed, a lever connected to said member, a counterweight connected to said lever, means for holding said counterweight in an elevated position and means for releasing said first named means to permit said weight to drop and thereby snap said gate loose.

JOHN WILLIAM CARTER.
TRUMAN H. KENNEDY.